US012786194B2

(12) United States Patent
Barnes et al.

(10) Patent No.: US 12,786,194 B2
(45) Date of Patent: Nov. 3, 2026

(54) SYSTEMS AND METHODS FOR PROVIDING AUTOMATED ACCESS TO RESOURCES OF COMPUTER SYSTEMS

(71) Applicant: T-Mobile Innovations LLC, Overland Park, KS (US)

(72) Inventors: Luke Barnes, Seattle, WA (US); Jacob Holman, Bonney Lake, WA (US); Wade Murri, Bellevue, WA (US); Praneeth Madhav Palla, Redmond, WA (US); Vardhaman Satish Patil, Bothell, WA (US); Scott Wilburn, Chattaroy, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 407 days.

(21) Appl. No.: 18/339,934

(22) Filed: Jun. 22, 2023

(65) Prior Publication Data

US 2024/0430261 A1 Dec. 26, 2024

(51) Int. Cl.
*H04L 9/40* (2022.01)

(52) U.S. Cl.
CPC .................................... *H04L 63/10* (2013.01)

(58) Field of Classification Search
None
See application file for complete search history.

(56) References Cited

U.S. PATENT DOCUMENTS

2015/0381629 A1* 12/2015 O'Sullivan ........... H04L 63/102 726/4
2020/0014702 A1* 1/2020 Dasgupta ................ G06F 21/45
2020/0162473 A1* 5/2020 Mercuri .................. G06F 21/64
2021/0258321 A1* 8/2021 Vegulla .................... G06N 5/04
2021/0281409 A1* 9/2021 Apsingekar ........... H04L 9/3226
2021/0385183 A1* 12/2021 Henao Mota ....... H04L 63/0838
2023/0244809 A1* 8/2023 Richmond .......... G06F 21/6218 726/26
2023/0269249 A1* 8/2023 Krishan ................ H04L 63/102 726/7
2023/0297707 A1* 9/2023 Albero ................ G06F 21/6218 726/28
2024/0289470 A1* 8/2024 Clauson ................ G06F 21/604
2024/0356955 A1* 10/2024 Tan ..................... H04L 63/1433

* cited by examiner

*Primary Examiner* — Scott B Christensen

(57) ABSTRACT

A method for automatically managing user access to resources of a communication system. The method includes receiving by a requester interface of an automated resource access manager a request by a user for access to a resource of the communication system, the access request communicated from user equipment (UE) of the user to the requester interface, and providing automatically by an approver interface of the automated resource access manager the access request to UE of an approver associated with the requested resource, the requested resource including a requested application of the communication system. The method additionally includes receiving by the approver interface either a granting of access to the requested application or a denial of access to the requested application, and providing automatically, by the requester interface, the user access to the requested application in response to receiving by the approver the granting of access to the requested application.

20 Claims, 11 Drawing Sheets

SYSTEMS AND METHODS FOR PROVIDING AUTOMATED ACCESS TO RESOURCES OF COMPUTER SYSTEMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication systems may in some instances be formed from hundreds or thousands of individual computer systems or terminals that are networked together such that one individual terminal of the communication system may communicate with the hundreds or thousands of other computer systems defining the communication system via the network linking together the different computer systems. In this manner, personnel associated with an operator or provider of the communication system, such as employees of the communication system provider, as well as other users may access resources (e.g., applications, tools, data) of the communication system located on computer systems other than the computer system used by the user to access the communication system.

SUMMARY

In an embodiment, a method for automatically managing user access to resources of a communication system is disclosed. The method includes receiving by a requester interface of an automated resource access manager a request by a user for access to a resource of the communication system, the access request communicated from user equipment (UE) of the user to the requester interface, and providing automatically by an approver interface of the automated resource access manager the access request to UE of an approver associated with the requested resource, the requested resource comprising a requested application of the communication system. The method additionally includes receiving by the approver interface either a granting of access to the requested application or a denial of access to the requested application, the granting of access or denial of access communicated from the UE of the approver to the approver interface, providing by the requester interface to the UE of the of the user a notification granting of access or the denial of access to the requested application, wherein the granting of access is conditioned on the user meeting a predefined access criteria, and providing automatically, by the requester interface, the user access to the requested application in response to receiving by the approver the granting of access to the requested application. Further, the method includes revoking automatically, by the requester interface, access to the requested application from the user in response to the user failing to satisfy the access criteria as determined by the automated resource access manager, and providing by an access records manager of the automated resource access manager a notification to the requested application of the revocation of the access of the user to the requested application.

In an embodiment, an additional method for automatically managing user access to resources of a communication system is disclosed. The method includes receiving by a requester interface of an automated resource access manager one or more requests by one or more users for access to one or more resources of the communication system, the one or more access requests communicated from one or more UE of the one or more users to the requester interface, and querying by an access records manager of the automated resource access manager a set of resource access records stored in a datastore of the communication system. Additionally, the method includes providing automatically by an approver interface of the automated resource access manager the one or more access requests to UE of one or more approvers associated with the one or more requested resources, and periodically auditing automatically by the access records manager using the set of resource access records the one or more users to determine which of the resources of the communication system the one or more users have previously been granted access and identities of approvers responsible for the granting of access to any of the resources of the communication system to which the one or more users have been previously granted access. The method further includes periodically updating by the access records manager the set of resource access records to indicate changes in access granted and revoked from the one or more users to one or more of the resources of the communication system based on the periodic auditing by the access records manager.

In an embodiment, a further method for automatically managing user access to resources of a communication system is disclosed. The method includes receiving by a requester interface of an automated resource access manager a request by a user for access to a resource of the communication system, the access request communicated from UE of the user to the requester interface, and querying by an access records manager of the automated resource access manager a set of resource access records stored in a datastore of the communication system. Additionally, the method includes providing automatically by an approver interface of the automated resource access manager the access request to UE of an approver associated with the requested resource wherein the approver is selected by the automated resource access manager based on an identity of the user and an identity of the requested resource, and receiving by the approver interface either a granting of access to the requested resource or a denial of access to the requested resource, the granting of access or denial of access communicated from the UE of the approver to the approver interface. Further, the method includes providing automatically, by the requester interface, the user access to the requested resource in response to receiving by the approver the granting of access to the requested resource.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
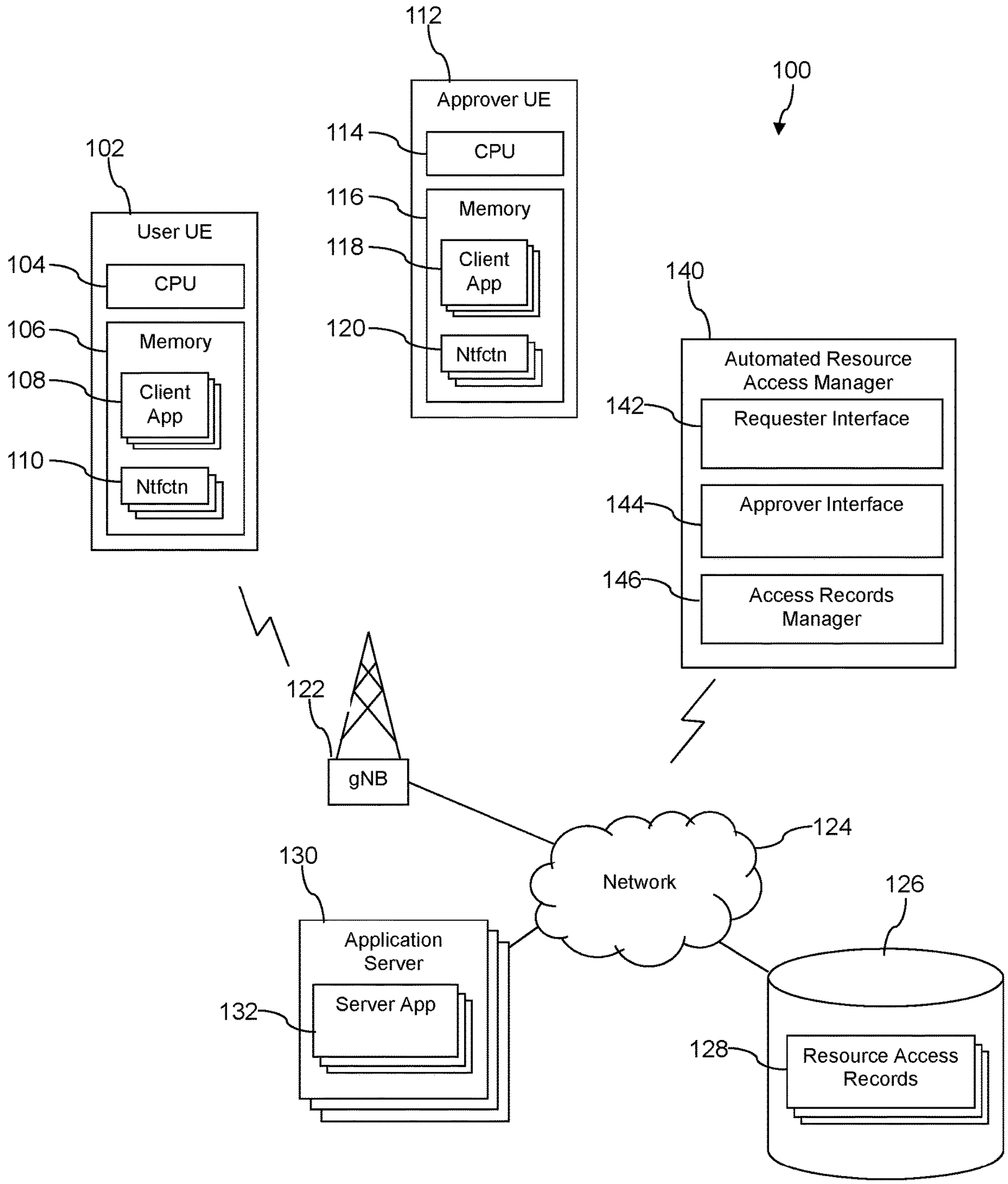
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "computer system" refers to both individual computer systems and networked computer systems which may collectively define a communication system. As described above, resources of a communication system may be accessed by different users for different purposes utilizing a network linking together the various individual computer systems defining the communication system. Resources of the communication system comprise computer or computer system resources that are housed on the computer system and which include, for example, sales information, human resources (HR) personnel records, marketing plans and other marketing materials, project scheduling tools, payroll records, network management systems, network node alarm monitoring systems, interactive voice recognition software, inventory control systems, system administration or root access for specified users to enterprise servers of the communication system, and configuration control systems of a software repository of the communication system. These various resources may be utilized by different users of the computer system for various reasons and for various durations with access to the resources being limited for security purposes.

Particularly, in many instances, it may be desirable by a provider of the communication system to limit access to specific resources available on the communication system to specific users previously having been granted access to the specific resources. For example, it may be desired to limit access to specific resources (e.g., enterprise applications, tools, and/or data) to users associated with the provider of the communication system, such as specific employees of the provider who require access to the specific resources in order to perform their professional duties.

Conventionally, the granting of access to specific resources of the communication system to specific users of the communication system is performed manually. For example, a user may manually request access to a specific resource of the communication system to an approver of access of the given resource (e.g., a supervisor or subject matter expert (SME) charged with providing or maintaining the given resource). The approver may then, depending on the credentials of the user (e.g., as provided by the user in the access request provided by the user to the approver) manually accept or deny the access request. For example, if the approver wishes to accept the access request from the given user, the approver may manually add the user to a whitelist of users granted access to the particular resource requested by the user. The whitelist may be in the form of an Active Directory (AD) security group which assigns permissions to specific users with respect to particular resources of the communication system. Upon being manually added to the whitelist by the approver, the user may then obtain access to the given resource via user equipment (UE) of the user connected to or part of the communication system. This process of manually requesting access to a specific resource of the communication system and manually accepting or rejecting by the approver the access request from the user may take multiple days to complete, potentially delaying access to resources of the communication system required by the user in a timely manner.

In addition to the delays introduced by manually requesting and granting or denying access to specific resources of the communication system, this manually intensive process also makes the auditing the user permissions to various resources of the communication system difficult if not impractical as such auditing must generally be conducted manually even for communication systems having thousands or more of individual users. Thus, with such conventional communication systems, once a user has been granted access to a specific resource the user may maintain access to the specific resource indefinitely, even if the credentials on which the original granting of permission to the specific resource was based are no longer applicable to the given user. As an example, due to the impracticalities associated with manually auditing conventional communication systems, an employee of an entity or company (e.g., a software provider, a provider of the communication system) associated with a specific resource may maintain access to the specific resource even long after the employee has left the company associated with the specific resource. Thus, it is not uncommon for users to have access to resources of the computer system which would have otherwise been revoked with adequate auditing of the user permissions to various resources of the communication system.

In addition to the issues described above (e.g., delay in granting of user permissions, maintaining of user permissions which should have been previously revoked), the need to manually grant or deny user permissions to various resources of the communication system also degrades the user experience of the communication system in other ways.

For example, users may not be aware of the status of their access request until or following the actual granting of access given that conventional communication systems also do not provide an automated system for notifying users of the status of their access request. In addition to being unaware of the status of their access request, the process of manually requesting access to specific resources may be convoluted, time consuming, and confusing for the user wishing to obtain access. Further, errors may be made by either the user requesting access or the approver such that a wrong user is granted access to the requested resource or the correct user may be granted access to the wrong resource (e.g., a resource unrelated to the resource associated with the access request made by the user). Moreover, without adequate auditing, the provider of the communication system may be unaware and unable to track these errors in order to determine which resources have been wrongly granted to the wrong users.

Accordingly, in an embodiment, systems and methods for automatically managing user permissions to resources of a communication system are provided. Particularly, the communication system includes an automated resource access manager which conveniently automates the process of requesting access by a user of the communication system to a specific resource of the communication system such as, for example, an application, a tool, and/or information contained in a datastore of the communication system. In some embodiments, the resource access manager includes a requester interface through which the user may communicate directly with the resource access manager of the communication system for requesting access to different resources of the communication system. For example, the requester interface may at least partially be provided by a server of the communication system which the user may access via a network of the communication system. As another example, the requester interface may at least partially be loaded onto UE of the user such that the user may make or initiate the access request using the user's own UE. In this manner, the user has access (via the requester interface) to a central portal through which the user may request access to myriad resources of the communication system, thus eliminating the cumbersome need for the user to manually search out the appropriate interface for requesting access to a given resource.

In some embodiments, in addition to the requester interface described above, the resource access manager includes an approver interface through which an approver associated with the requested resource (e.g., a person tasked with managing or operating the requested resource) may communicate directly with the resource access manager. In some embodiments, the approver is selected by the resource access manager based on an identity of the user and an identity of the requested resource. For example, in instances where the requested resource comprises a security group, the approver may be selected by the resource access manager based on an identity of the security group. Additionally, the requested security group may have a plurality of distinct access tiers, where the approver is selected by the resource access manager based on the access tier of the plurality of access tiers of the requested access group identified as appropriate (e.g., based on an identity of the user, the reason provided by the user for needing access to the requested access group) for the user by the resource access manager.

The requester interface may automatically direct an access request initiated by a user to the appropriate approver using the approver interface so that the appropriate approver may either grant the user access to the requested resource or deny access to the requested resource. In this manner, the requester interface and the approver interface of the resource access manager may conveniently establish a direct, bi-directional communication link between the user and the approver.

In certain embodiments, in addition to the requester and approver interfaces, the resource access manager includes an access records manager which may access and potentially update or modify a set of resource access records stored in a datastore of the communication system. The resource access manager, using the set of resource access records, may identify automatically the appropriate approver to which an access request by a user should be directed by the approver interface. Additionally, information pertaining to the specific user requesting access and/or the requested resource may be provided from the set of resource access records to the approver via the approver interface. For example, the approver interface may include information from the set of resource access records pertaining to access constraints associated with the requested resource, such as a predefined maximum access time period during which the user may enjoy access to the requested resource once access has been granted by the approver. The approver interface may include information from the set of resource access records pertaining to the user, such as current privileges previously granted to the user with respect to different resources of the communication system, a log of the past access requests made by the user, and/or a log of past denials of access requests made by the user. This additional information provides helpful context to the approver regarding the access request made by the user via the convenient, single interface provided to the approver via the approver interface.

Further, in some embodiments, the resource access manger automatically revokes access previously granted to a user should one or more of the constraints conditioning access to a requested resource be violated by the user. To state in other words, the resource access manger may automatically revoke previously granted access should the user fail to meet a predefined access criteria associated with the requested resource. For example, the resource access manager may revoke automatically access to a requested resource previously granted to a user at the expiration of a maximum access time period associated with the resource. In another example, the resource access manager may revoke automatically access to a requested resource previously granted to a user should the status of the user (e.g., employment of the user at an entity associated with the resource) change in a manner that violates one or more of the constraints conditioning access to a requested resource. In this manner, access to specific resources may only be maintained should the one or more constraints conditioning access to the resource remain unabridged by the user whether through a change in status of the user or through constraints specific to the resource itself.

In some embodiments, the access records manager provides a notification to the requested resource (e.g., a requested application) of the revocation of the access of the user to the requested application. In this manner, the requested application may update its own security functions to reflect the loss of access to the respective user so that the user may not gain access, in an end-around fashion (e.g., in an attempt to circumnavigate the resource access manager) to the requested application. Additionally, in certain embodiments, the access records manager provides a notification to the requested application identifying a cause or reason behind the revocation of access from the user to the requested application.

In certain embodiments, in addition to facilitating the correct routing of access requests to the appropriate user and the provisioning of additional information to the approver, the access records manager facilitates the periodic and automatic auditing using the set of resource access records to determine which of the resources of the communication system the user has previously been granted access and identities of approvers responsible for the granting of access to any of the resources of the communication system to which the user has been previously granted access. In this manner, the access records manager may eliminate the granting of access of users to resources which, in accordance with the set of resource access records, the user is no longer entitled to access. This periodic auditing (e.g., conducted every fifteen minutes or other intervals) may include determining automatically if a user has violated a constraint placed on the user's access to a given resource of the communication system, as well as determining automatically if the user was initially incorrectly granted access to the given resource. For example, by consulting the set of resource access records, the resource access manager may determine that access was originally granted by an inappropriate approver and thus revoke automatically access to the resource in response to discovering this error. In some embodiments, the access records manager additionally periodically updates the set of resource access records to indicate changes in access granted and revoked from the one or more users to one or more of the resources of the communication system based on the periodic auditing by the access records manager. The cadence at which the set of resource access records is periodically updated by the access records manager may vary from the cadence at which the set of resource access records are periodically audited.

Turning to FIG. 1, a communication system 100 is described. As previously described, it may be understood that communication system 100 comprises a computer system, such as a networked computer system. In an embodiment, the communication system 100 generally includes a first or user electronic device (user equipment-UE) 102, a second or approver electronic device or UE 112, an access node 122, a network 124, a datastore 126, an application server 130, and an automated resource access manager 140. It may be understood that in at least some embodiments the resource access manager 140 is implemented as one or more software applications executing on a computer system. The user UE 102 and approver UE 112 may each comprise, for example, a desktop computer, a workstation, a laptop computer, a tablet computer, a smartphone, a wearable computer, an internet of things (IoT) device, and/or a notebook computer. User UE 102 may be operated by a user or customer of the network 124 such as an enterprise, organization, or individual. Additionally, approver UE 112 may be operated by a person assigned with managing or operating one or more resources of the communication system 100, such as a SME associated with the one or more resources. As discussed above, resources of communication systems, including communication system 100, comprise computer or computer system resources that are hosted on the computer system and which include, for example, sales information, human resources (HR) personnel records, marketing plans and other marketing materials, project scheduling tools, payroll records, network management systems, network node alarm monitoring systems, interactive voice recognition software, inventory control systems, system administration or root access for specified users to enterprise servers of the communication system, and configuration control systems of a software repository of the communication system.

The access node 122 of communication system 100 may provide communication coupling the UE 102 to the network 124 according to a 5G protocol, for example 5G, 5G New Radio, or 5G LTE radio communication protocols. The access node 122 may provide communication coupling the UE 102 and UE 112 to the network 124 according to a long term evolution (LTE), a code division multiple access (CDMA), and/or a global system for mobile communication (GSM) radio communication protocol. The access node 122 may be referred to for some contexts as a gigabit Node B (gNB), an enhanced Node B (eNB), a cell site, or a cell tower. Additionally, while not shown, UE 102 and UE 112 may each be communicatively coupled to the network 124 via a WiFi access point or another non-cellular radio device. Further, while a single access node 122 is illustrated in FIG. 1, it is understood that communication system 100 may comprise any number of access nodes 122.

The network 124 of communication system 100 may comprise one or more public networks, one or more private networks, or a combination thereof. For example, network 124 may comprise a core network, such as a 5G core network. Further details of 5G networks are discussed below with reference to FIGS. 9A, 9B. While shown as communicatively coupled to the network 124, datastore 126, application server 130, and resource access manager 140 may be considered part of network 124 and are illustrated as separate from network 124 in FIG. 1 to promote discussing their roles with respect to UE 102 and UE 112, as will be discussed further herein. Additionally, although in FIG. 1 network 124 is shown as including only a single datastore 126 and application server 130, it may be understood that network 124 may include varying numbers of datastores and servers.

Each UE 102 and 112 includes a processor or CPU 104 and 114, respectively, and a memory 106 and 116, respectively, in signal communication with the given processor 104 and 114. Additionally, each UE 102 and 112 includes one or more client applications 108 and 118, respectively, stored in a non-transitory portion of the memory 106 and 116 and executable by the processor 104 and 114, respectively. Additionally, the execution of client applications 108 and 118 by a user of UEs 102 and 112 may generate one or more notifications 110 and 120, respectively, associated with the client applications 108 and 118.

Each UE 102 and 112 may access various resources of network 124 through the access node 122. For example, users of UEs 102 and 112 may transmit information from UEs 102 and 112 to the network 124 through the access node 122 and save the transmitted information on the network 124, such as on datastore 126. In addition, UEs 102 and 112 may access at least some of the resources of the application server 130, where application server 130 may include one or more server applications 132. Server applications 132 may provide one or more services or features accessible by the user through the UEs 102 and 112. The accessing of the one or more server applications 132 by the UEs 102 and 112 may trigger the generation of one or more notifications 110 by the client applications 108 and 118 of UEs 102 and 112, respectively.

In this exemplary embodiment, datastore 126 comprises a set of resource access records 128 providing a centralized repository of information regarding various users of the communication system 100 (e.g., users of UEs 102 and 112)

and their various permissions with respect to different resources of the communication system (e.g., privileges associated with server applications 132). In some embodiments, resource access records 128 contains a list or log identifying which users of communication system 100 are currently granted access to different resources of the communication system 100. For example, resource access records 128 may identify which users of communication system 100 are currently granted access to one or more of the server applications 132. Resource access records 128 may also include additional user information such as logs of past access requests (identifying the user making the request and the identity of the requested resource) initiated by users, logs of past granting or denial of previously initiated access requests, and/or logs of past revocation of granted access of users to given resources of the communication system 100 (e.g., identifying the user, the resource from which previously granted access was revoked, and potentially a reason or explanation behind the revocation).

In some embodiments, resource access records 128 also identifies one or more approvers currently having permission to grant or deny access requests (e.g., grant or deny access to one or more of the server applications 132) initiated by users of the communication system 100. Thus, resource access records 128 may be utilized to ensure access requests are routed to the currently appropriate approver for determining whether or not a given user may be granted access to a given resource of the communication system 100. In some embodiments, one or more particular approvers of the approvers identified by resource access records 128 is selected by the resource access manager 140 based on an identity of the user and an identity of the requested resource.

In certain embodiments, resource access records 128 contains information with respect to the conditions attached to access of various resources of the communication system 100. Particularly, resource access records 128 may apply one or more constraints to the access granted to the user of a requested resource whereby the access granted to the user of the requested resource is subject to revocation in response to a violation by the user of the one or more constraints. As an example, resource access records 128 may include a rule applying a predefined maximum access time period to a given resource (e.g., a given server application 132) such that, upon granting of access of a user to the given resource, access to the resource may automatically expire and be revoked at the conclusion of the access time period. As another example, resource access records 128 may include a rule associated with a given resource of communication system 100 conditioning access to the resource on the user actually accessing and using the resource within a predefined period of time following the granting of access of the user to the resource by an appropriate approver associated with the resource. Thus, access may be revoked automatically should the user fail to access or otherwise use the resource within the predefined period of time following the granting of access of the user to the resource.

In some embodiments, resource access records 128 may include a rule conditioning access to a given resource of communication system 100 based on a status of a user either requesting access or to which access has been previously granted. For example, access to the resource may be conditioned on the user's continuing association or employment with an entity (or the user maintaining a given role with the entity) associated with the respective resource of the communication system 100. In this manner, access of the user to the respective resource may be automatically revoked upon the determination of a salient change to the user's status, such as the user no longer being employed or otherwise associated with the entity associated with the respective resource.

The automated resource access manager 140 of communication system 100 automatically facilitates the requesting and granting or denial of access to various resources of communication system 100 (e.g., server applications 132). In this exemplary embodiment, resource access manager 140 includes a requester interface 142, an approver interface 144, and an access records manager 146. The requester interface 142 provides a centralized interface or portal through which the various users of communication system 100 may request access to various resources of communication system 100. As an example, a user of UE 102 may request access to one or more of the server applications 132 of communication system 100 through and using the requester interface 142 of automated resource access manager 140. In this manner, the UE 102 of the user and the requester interface 142 may communicate directly across the network 124 of communication system 100. In some embodiments, the requester interface 142 may be at least partially loaded on a server of the communication system 100 which the user may access via the network 124. In certain embodiments, at least a portion of the requester interface 142 may be loaded directly on UE 102 of the user. For example, one of the client applications 108 of UE 102 may comprise an access request application forming or defining at least a portion of the requester interface 142.

The approver interface 144 of resource access manager 140 provides a centralized interface or portal through which approvers associated with the various resources of communication system 100 may grant or deny an access request initiated by a user of communication system 100 via the requester interface 142. As an example, an approver associated with a given resource of communication system 100 may receive a notification 120 on their UE 112 notifying them of an access request made by the user of UE 102 pertaining to a resource of communication system 100 (e.g., one of the server applications 132) associated with the given approver and over which the approver has been granted privileges to grant or deny access thereto. It may also be understood that the requester interface 142 may also provide a notification 110 to the user of UE 102 notifying them that the access request has been directed to the appropriate approver for determining whether the access request initiated by the user should be granted or denied.

It may be understood that in at least some instances a plurality of approvals from a corresponding plurality of separate appropriate approvers may be required in order to access a given resource of communication system 100. Additionally, in some instances, any one of the plurality of appropriate approvers may complete the approval autonomously or independently of the other appropriate approvers.

In some embodiments, a direct, bi-directional link is formed between UE 102 of the user and UE 112 of the approver that is facilitated by the requester interface 142 and approver interface 144 of resource access manager 140. In this manner, information may be shared directly between the user requesting access and the approver tasked with granting or denying access of the user to the requested resource. For example, the user may provide the approver with contextual information (e.g., why the user is requesting access to the respective resource) relating to the access request, and the approver may provide the user with contextual information pertaining to the resource (e.g., what conditions apply to access granted to the resource) or to the approver's decision behind granting or denying access (e.g., explaining why the access request was denied). This bi-directional communication link between the user and approver facilitated by the resource access manager 140 enhances communication between the user and approver during the process of requesting access to the various resources of communication system 100.

The access records manager 146 of resource access manager 140 is generally configured to access and potentially modify or update the resource access records 128 stored in the datastore 126 of communication system 100. In this manner, access records manager 146 permits the resource access manager 140 to access the information contained within resource access records 128 to guide the process of directing access requests to the appropriate approvers, and facilitating the granting, denial, or revocation of access of users to the various resources of communication system 100. As an example, the access records manager 146, in response to the resource access manager 140 receiving an access request from the user of UE 102, may consult the resource access records 128 to determine which approver is currently responsible for granting or denying access to the requested resource (e.g., one of the server applications 132). This information may then be used by the approver interface 144 of resource access manager 140 to transmit a notification 120 to the UE 112 of the appropriate approver.

In addition to the above, access records manager 146 may access and obtain other information such as currently active constraints placed on access to a resource requested by a given user of communication system 100 such as, for example, a maximum access time period for the requested resource, a required status of the user or other predefined access criteria required in order to obtain and maintain access to the requested resource, a requirement for the user to access or otherwise use the requested resource within a predefined period of time following granting of access to the requested resource, as well as other constraints and related information. This additional information, once obtained by the access records manager 146, may be provided as notifications (e.g., notifications 110 and 120) to the UEs (e.g., UEs 102 and 112) of the requesting user and the appropriate approver.

Further, in some embodiments, access records manager 146 facilitates the automatic auditing using the resource access records 128 to determine to which of the resources of the communication system the user has previously been granted access and identities of approvers responsible for the granting of access to any of the resources of the communication system to which the user has been previously granted access. For example, the access records manager 146 may automatically initiate an audit pertaining to one or more resources of the communication system 100 in which the access records manager 146 may determine whether access of users currently granted to the one or more resources have not violated any access criteria associated with the one or more resources.

Additionally, the access records manager 146 may determine whether the access of the users granted to the one or more resources of communication system 100 was provided by an appropriate approver by consulting the resource access records 128. In this manner, the access records manager may automatically determine if any of the users were initially incorrectly granted access to the one or more resources of the communication system 100, and/or whether if any of the users have violated any of the access criteria associated with the one or more resources. The access records manager 146 may automatically revoke access to any users that the manager 146 has determined were initially incorrectly granted access, or have otherwise violated any of the access criteria associated with the one or more resources. It may be understood that the auditing performed by access records manager 146 may be performed periodically in accordance with a predefined cadence, at the prompting of a user of the communication system 100, or on other bases. In some embodiments, the access records manager 146 provides a notification to the requested resource (e.g., a requested application) of the revocation of the access of the user to the requested application. In this manner, the requested application may update its own security functions to reflect the loss of access to the respective user. Additionally, in certain embodiments, the access records manager 146 additionally periodically updates the resource access records 128 to indicate changes in access granted and revoked from the one or more users to one or more of the resources based on the periodic auditing by the access records manager 146.

Figure 2:
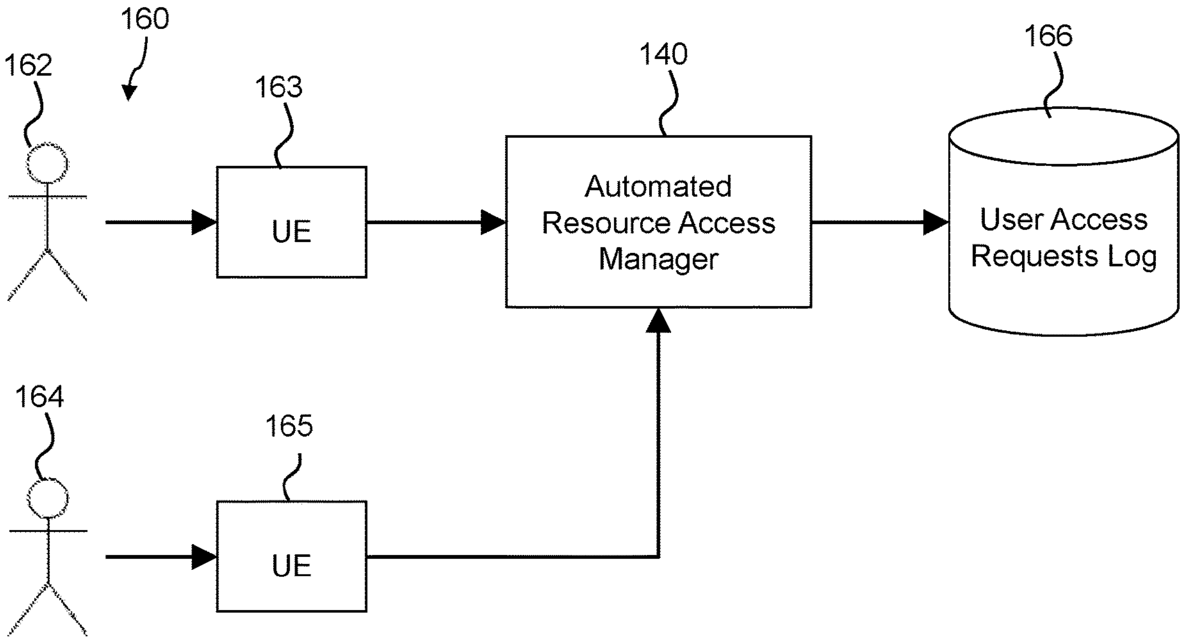
FIG. 2 is a flowchart of an automated process for a user of a communication system to initiate an access request pertaining to one or more resources of the communication system according to an embodiment of the disclosure.

Turning to FIG. 2, a flowchart 160 of an exemplary automated process for a user of the communication system 100 of FIG. 1 to initiate an access request pertaining to one or more resources of communication system 100. Particularly, a first user 162 of communication system 100 may initiate a first access request using their UE 163 whereby the user may obtain access to the automated resource access manager 140 of communication system 100. Similarly, a second user 164 of communication system 100 may initiate a second access request using their UE 165 whereby the user may obtain access to the automated resource access manager 140 of communication system 100.

It may be understood that the first access request may pertain to resources of communication system 100 which differ from the resources pertaining to the second access request. Additionally, it may be understood that the first user 162 and the second user 164 may make their respective access requests via applications loaded onto their respective UEs 163 and 165 which embody at least a portion of the requester interface 142 of the resource access manager 140. Alternatively, the first user 162 and/or second user 164 may access the requester interface 142 via a web page loaded onto an Internet browser of their respective UEs 163 and 165. Further, having received the access requests from users 162 and 164, the resource access manager 140 automatically stores the access requests in a user access request log 166 in a datastore of the communication system 100 (e.g., datastore 126). In some embodiments, the user access requests log 166 comprises a component of the resource access records 128 illustrated in FIG. 1.

Figure 3:
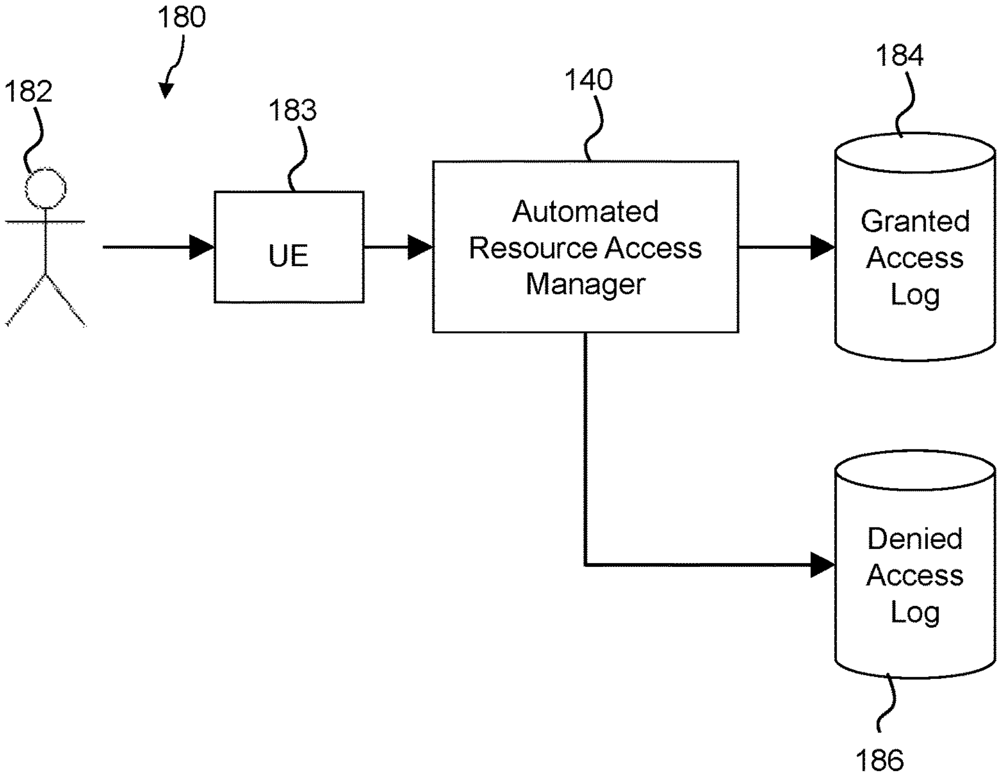
FIG. 3 is a flowchart of an automated process for approving or denying an access request initiated by a user of a communication system according to an embodiment of the disclosure.

Turning to FIG. 3, a flowchart 180 of an exemplary automated process for approving or denying an access request initiated by a user of the communication system 100 of FIG. 1. Particularly, an appropriate approver 182 associated with the resources pertaining to the access requests initiated by users 162 and 164 illustrated in FIG. 2 may access the approver interface 144 illustrated in FIG. 1 via their UE 183. For example, at least a portion of the approver interface 144 may be loaded onto the UE 183 as an application, or the approver 182 may navigate an Internet browser of their UE 183 to a web page hosting the approver interface 144. In this manner, the automated resource access manager 140 which may provide the approver 182 with notifications (e.g., via the application loaded onto their UE 183 or on the web page hosting the approver interface 144) notifying the approver 182 of the access requests made by the users 162 and 164 of communication system 100. The notifications provided to approver 182 may be appended with contextual information pertaining to the requested resources and/or the users 162 and 164 such as constraints placed on access to the requested resources, information pertaining to prior access requests made by users 162 and 164, information pertaining to the relationship between users 162 and 164 and the requested resources, etc.

Upon receiving the notifications of the access requests from users 162 and 164, the approver 182, via their UE 183, may either grant or deny access of the users 162 and 164 to the requested resources. The approver 182 may also forward a notification to the users 162 and/or 164 requesting, for example, additional information pertaining to their access requests so the approver 182 may determine whether to grant or deny access to the requested resources. It may be understood that if the approver 182 decides to grant access of users 162 and/or 164 to the requested resources, the granting of access may be only for a predefined period of time corresponding to a maximum access time period at the expiration of which access to the requested resources is automatically and immediately revoked. The duration of the maximum access time period may be specific to the resources requested by users 162 and 164. Additionally, it may be understood that a notification may be provided automatically by the resource access manager 140 via the requester interface 142 notifying the users 162 and/or 164 of the pending expiration of the maximum access time period, providing the users 162 and/or 164 with an opportunity to re-request access to the given resources prior to the expiration of the maximum access time period.

Following this determination made by the approver 182, the resource access manager 140 stores a record of the granting of access to the requested resources in a granted access log 184, and/or stores a record of the denial of access to the requested resources in a denied access log 186. The logs 184 and/or 186 may be stored in a datastore of the communication system 100 (e.g., datastore 126). In some embodiments, the logs 184 and/or 186 comprise a component of the resource access records 128 illustrated in FIG. 1, following the granting of access.

Figure 4:
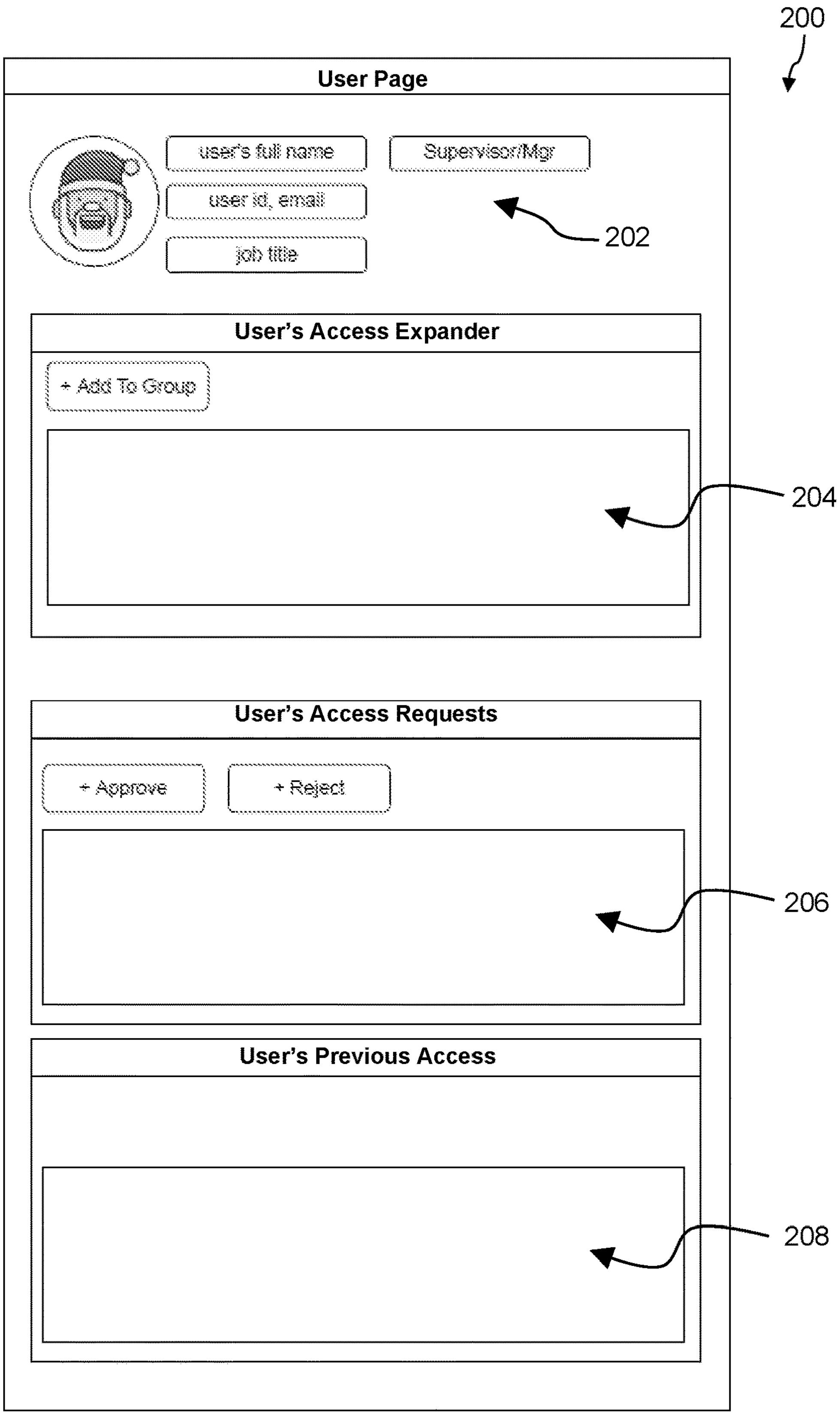
FIG. 4 is a screenshot of a user page of a user of a communication system according to an embodiment of the disclosure.

Referring now to FIG. 4, an exemplary screenshot is presented of a user page 200 of one of the users of communication system 100 illustrated in FIG. 1 that forms a component of the requester interface 142 of the automated resource access manager 140 also illustrated in FIG. 1. Particularly, the user page 200 may be loaded onto a UE of the user as part of a user application or accessible by the user via a web page to which the user may navigate via an Internet browser of their UE. In this exemplary embodiment, user page 200 includes user information 202 such as, for example, the user's full name, the user's identity (ID) and contact information (e.g., their email address), the identity of the user's employer (e.g., should the user be an employee of a provider of the communication system 100) and the user's job title, and the identity of the user's supervisor.

Additionally, the user page 200 includes a user's access expander 204 identifying the different permissions currently held by the user pertaining to different resources of the communication system 100. Particularly, the user's access expander 204 may identify each group (e.g., each AD security group) to which the user currently has access where each group corresponds to one or more resources of the communication system 100. In this way, the user may utilize his/her user page 200 to monitor which resources of the communication system 100 the user currently has access. In some embodiments, the user's access expander 204 may additionally identify which access tier of the group the user currently has access to when the group contains a plurality of distinct access tiers.

The user page 200 also includes a list of the user's access requests 206 identifying the currently pending access requests initiated by the user and which a determination of granting or denial by an appropriate approver has yet to be made. Thus, the user may utilize the user page 200 to monitor the status of currently pending access requests 206. In some embodiments, the user may, via the bi-directional link established between the requester interface 142 and the approver interface 144 illustrated in FIG. 1, communicate with the appropriate approver regarding the status of currently pending access requests 206. The user page 200 further includes a list of the user's previous access permissions 208 identifying the resources of communication system 100 (e.g., by group such as by AD security group) to which the user previously had access but no longer enjoys access.

Figure 5:
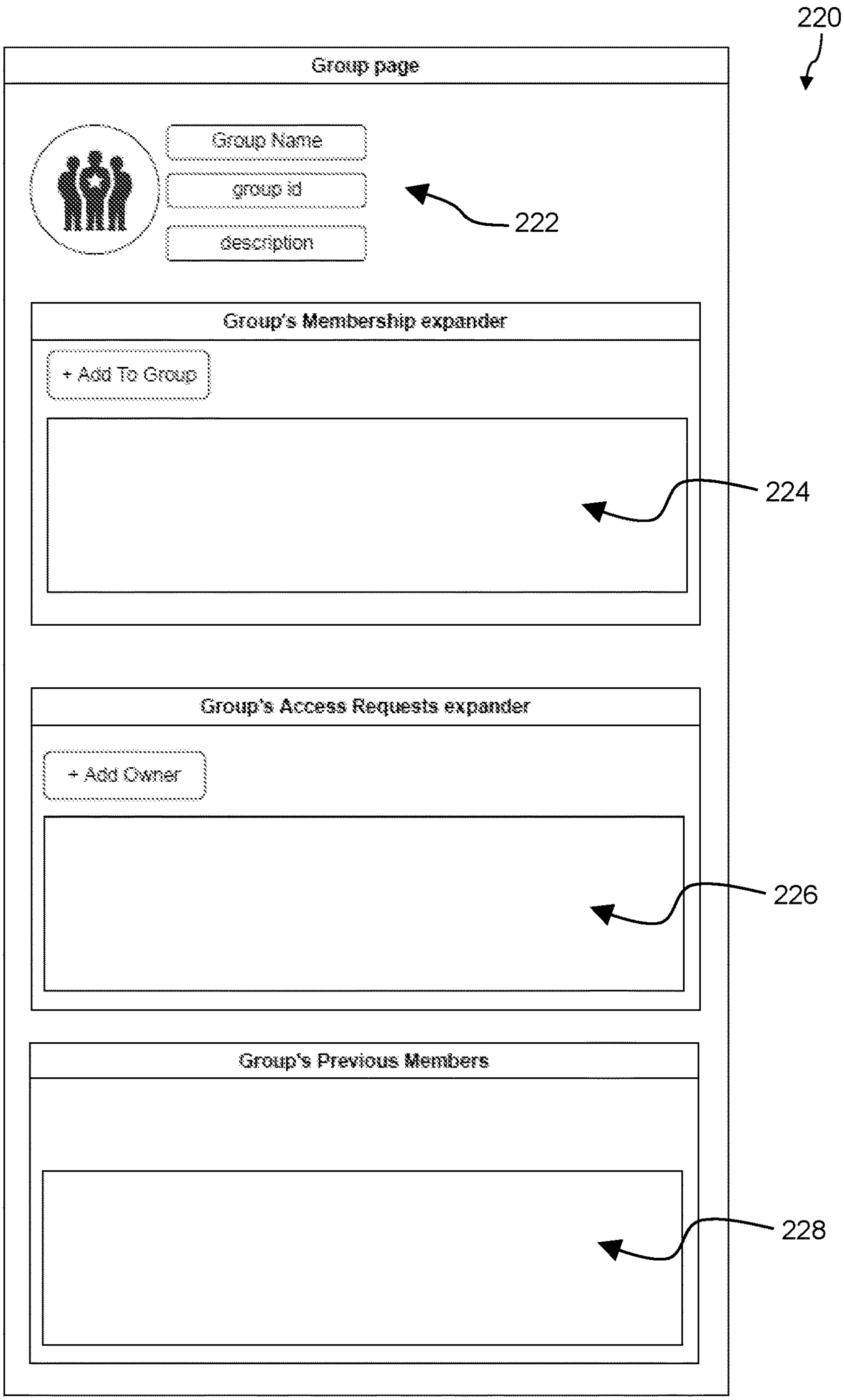
FIG. 5 is a screenshot of a group page 220 associated with one or more resources of a communication system according to an embodiment of the disclosure.

Referring now to FIG. 5, an exemplary screenshot of a group page 220 associated with a resource of the communication system 100 illustrated in FIG. 1 is shown. Particularly, in some embodiments, group page 220 is associated with a group, such as an AD security group, pertaining to one or more of the resources of communication system 100. In some embodiments, the group page 220 is accessible, via the approver interface 144 illustrated in FIG. 1, by an appropriate approver associated with the given group page 220 (e.g., an approver assigned with managing the group corresponding to the group page 220).

In this exemplary embodiment, group page 220 includes information identifying the group corresponding to the group page 220 including, for example, a group name, a group identity (ID), and a description of the group such as a description of the resources of communication system 100 associated with the group. Additionally, group page 220 includes a group membership expander 224 identifying each of the users of communication system 100 currently belonging to the group and thus currently having access to the one or more resources corresponding to the group.

In this exemplary embodiment, group page 220 additionally includes a group access request expander 226 identifying the users currently having pending access requests to join the group or otherwise access the resources of communication system 100 corresponding to the group. It may be understood that the addition of a new access request to the group access request expander 226 may result in a notification being provided automatically by the approver interface 144 to the appropriate approver associated with the group of group page 220.

Further, in this exemplary embodiment, the group page 220 includes a list of the group's previous members 228 identifying the users of communication system 100 previously having access to the group but no longer enjoying access to the group. In addition to listing the identities of the previous members of the group, the list of the group's previous members 288 may also include or link to contextual information regarding, for example, the reason why a given user lost access to the group and when the loss of access occurred.

Figure 6:
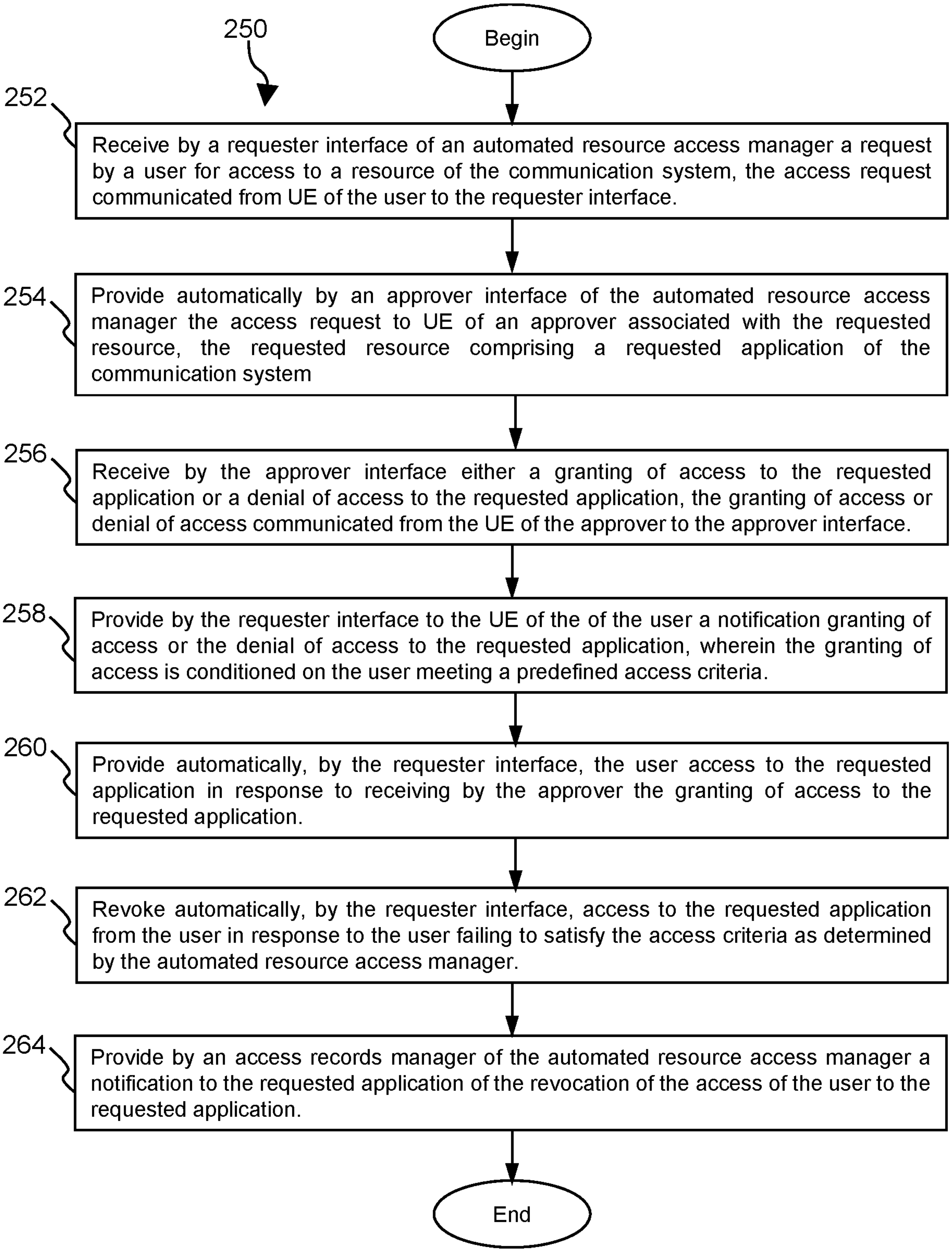
FIG. 6 is a flow chart of a method according to an embodiment of the disclosure.

Turning to FIG. 6, a method 250 is described. In an embodiment, the method 250 is a method for automatically managing user access to resources of a communication system (e.g., communication system 100 illustrated in FIG. 1). At block 252, method 250 comprises receiving by a requester interface of an automated resource access manager (e.g., requester interface 142 of the resource access manager 140 illustrated in FIG. 1) a request by a user for access to a resource (e.g., one of the server applications 132 illustrated in FIG. 1) of the communication system, the access request communicated from UE of the user (e.g., UE 102 illustrated in FIG. 1) to the requester interface. At block 254, method 250 comprises providing automatically by an approver interface (e.g., approver interface 144 illustrated in FIG. 1) of the automated resource access manager the access request to UE (e.g., UE 112 illustrated in FIG. 1) of an approver associated with the requested resource, the requested resource comprising a requested application (e.g., server applications 132 illustrated in FIG. 1) of the communication system.

At block 256, method 250 comprises receiving by the approver interface either a granting of access to the requested application or a denial of access to the requested application, the granting of access or denial of access communicated from the UE of the approver to the approver interface. At block 258, method 250 comprises providing by the requester interface to the UE of the of the user a notification (e.g., a notification 110 illustrated in FIG. 1) granting of access or the denial of access to the requested application, wherein the granting of access is conditioned on the user meeting a predefined access criteria.

At block 260, method 250 comprises providing automatically, by the requester interface, the user access to the requested application in response to receiving by the approver the granting of access to the requested application. At block 262, method 250 comprises revoking automatically, by the requester interface, access to the requested application from the user in response to the user failing to satisfy the access criteria as determined by the automated resource access manager. At block 264, method 250 comprises providing by an access records manager (e.g., access records manager 146 illustrated in FIG. 1) of the automated resource access manager a notification to the requested application of the revocation of the access of the user to the requested application.

Figure 7:
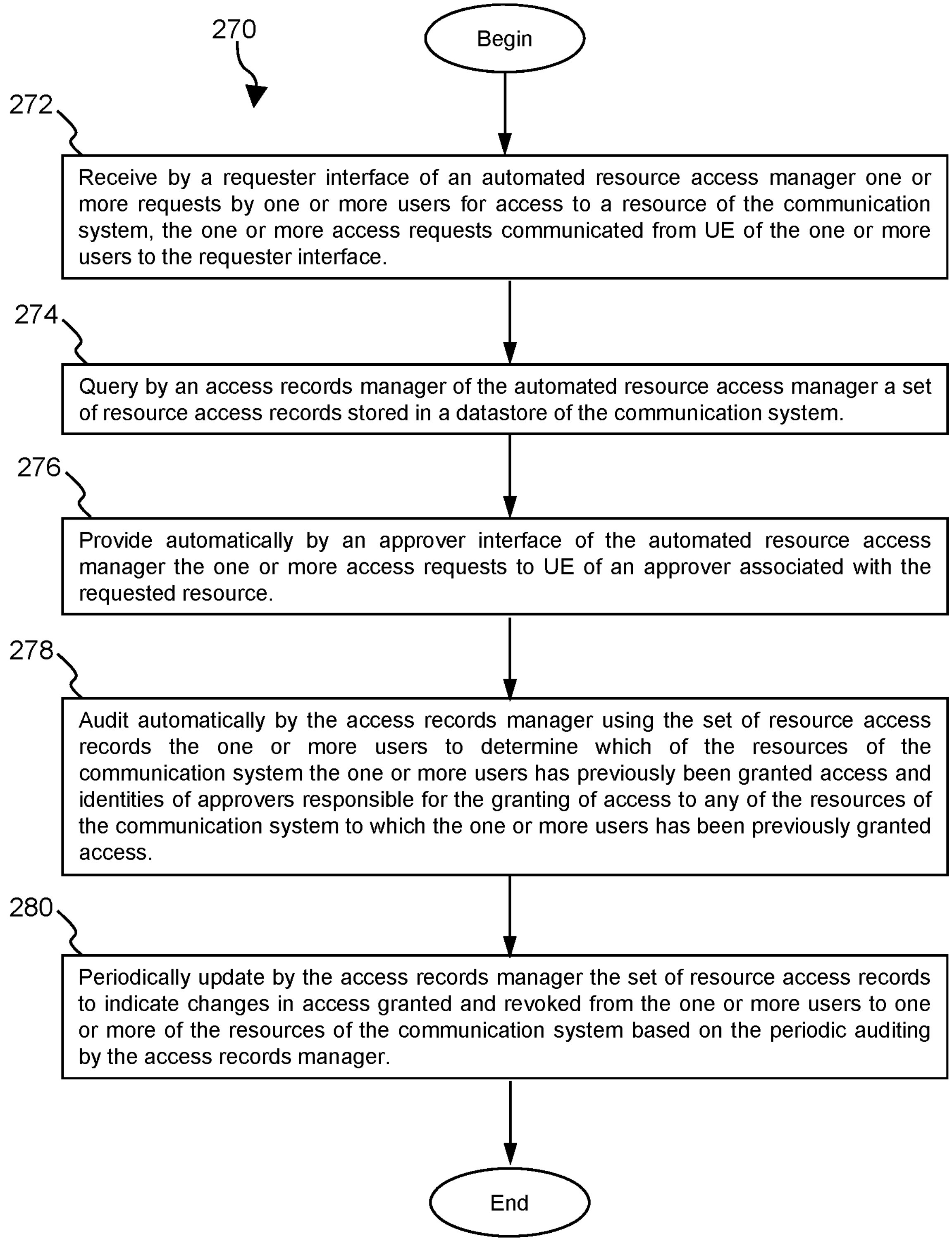
FIG. 7 is a flow chart of another method according to an embodiment of the disclosure.

Turning to FIG. 7, a method 270 is described. In an embodiment, the method 270 is a method for automatically managing user access to resources of a communication system (e.g., communication system 100 illustrated in FIG. 1). At block 272, method 270 comprises receiving by a requester interface of an automated resource access manager (e.g., requester interface 142 of the resource access manager 140 illustrated in FIG. 1) one or more requests by one or more users for access to a resource (e.g., one of the server applications 132 illustrated in FIG. 1) of the communication system, the one or more access requests communicated from UE of the one or more users (e.g., UE 102 illustrated in FIG. 1) to the requester interface. At block 274, method 270 comprises querying by an access records manager (e.g., access records manager 146 illustrated in FIG. 1) of the automated resource access manager a set of resource access records (e.g., resource access records 128 illustrated in FIG. 1) stored in a datastore (e.g., datastore 126 illustrated in FIG. 1) of the communication system.

At block 276, method 270 comprises providing automatically by an approver interface (e.g., approver interface 144 illustrated in FIG. 1) of the automated resource access manager the one or more access requests to UE (e.g., UE 112 illustrated in FIG. 1) of an approver associated with the requested resource. At block 278, method 270 comprises periodically auditing automatically by the access records manager using the set of resource access records of the one or more users to determine which of the resources of the communication system the one or more users has previously been granted access and identities of approvers responsible for the granting of access to any of the resources of the communication system to which the one or more users has been previously granted access. At block 280, method 270 comprises periodically updating by the access records manager the set of resource access records to indicate changes in access granted and revoked from the one or more users to one or more of the resources of the communication system based on the periodic auditing by the access records manager.

Figure 8:
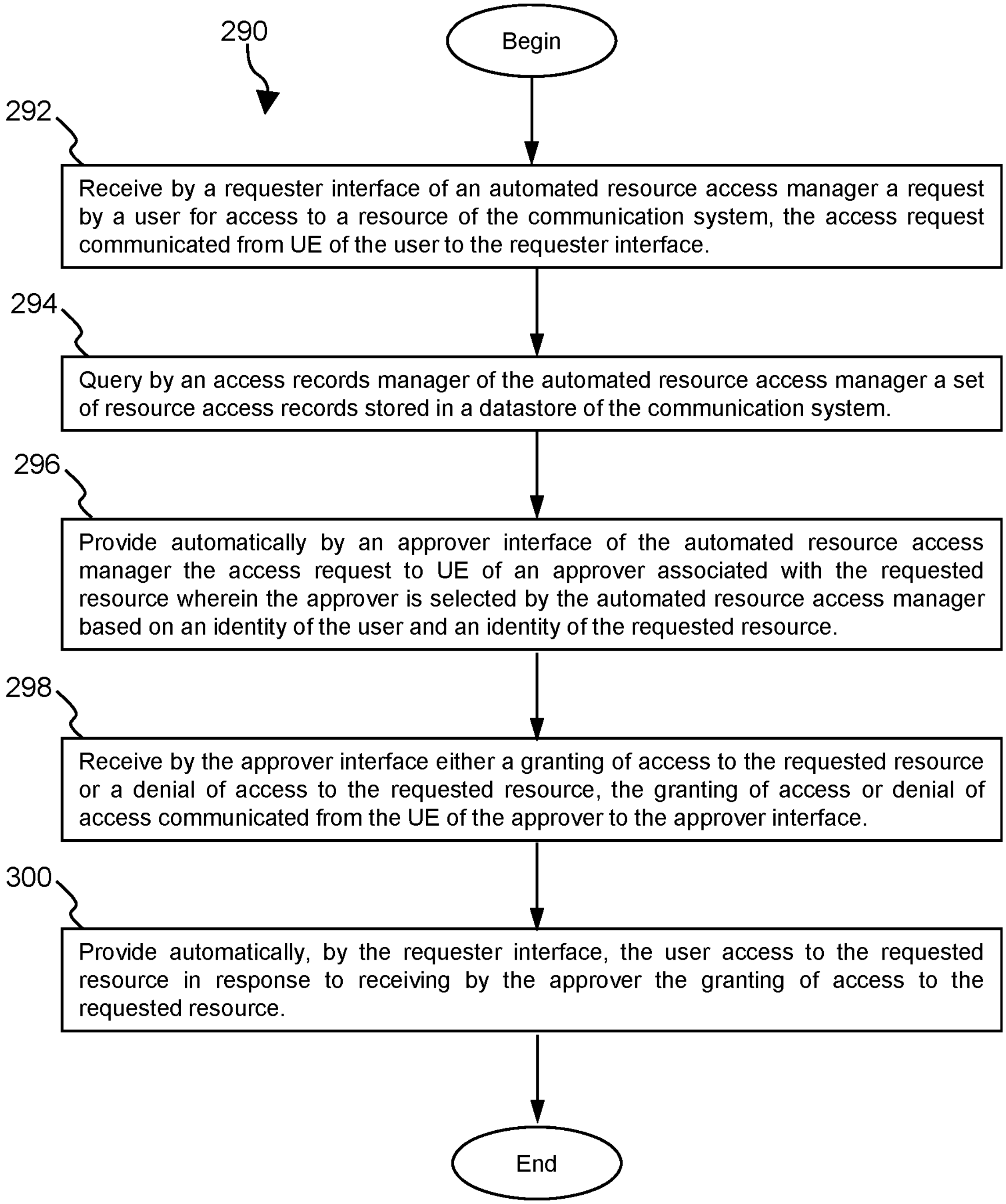
FIG. 8 is a flow chart of another method according to an embodiment of the disclosure.

Turning to FIG. 8, a method 290 is described. In an embodiment, the method 290 is a method for automatically managing user access to resources of a communication system (e.g., communication system 100 illustrated in FIG. 1). At block 292, method 290 comprises receiving by a requester interface of an automated resource access manager (e.g., requester interface 142 of the resource access manager 140 illustrated in FIG. 1) a request by a user for access to a resource (e.g., one of the server applications 132 illustrated in FIG. 1) of the communication system, the access request communicated from UE of the user (e.g., UE 102 illustrated in FIG. 1) to the requester interface. At block 294, method 290 comprises querying by an access records manager (e.g., access records manager 146 illustrated in FIG. 1) of the automated resource access manager a set of resource access records (e.g., resource access records 128 illustrated in FIG. 1) stored in a datastore (e.g., datastore 126 illustrated in FIG. 1) of the communication system.

At block 296, method 290 comprises providing automatically by an approver interface (e.g., approver interface 144 illustrated in FIG. 1) of the automated resource access manager the access request to UE (e.g., UE 112 illustrated in FIG. 1) of an approver associated with the requested resource wherein the approver is selected by the automated resource access manager based on an identity of the user and an identity of the requested resource. At block 298, method 290 comprises receiving by the approver interface either a granting of access to the requested resource or a denial of access to the requested resource, the granting of access or denial of access communicated from the UE of the approver to the approver interface. At block 300, method 290 comprises providing automatically, by the requester interface, the user access to the requested resource in response to receiving by the approver the granting of access to the requested resource.

Figure 9A:
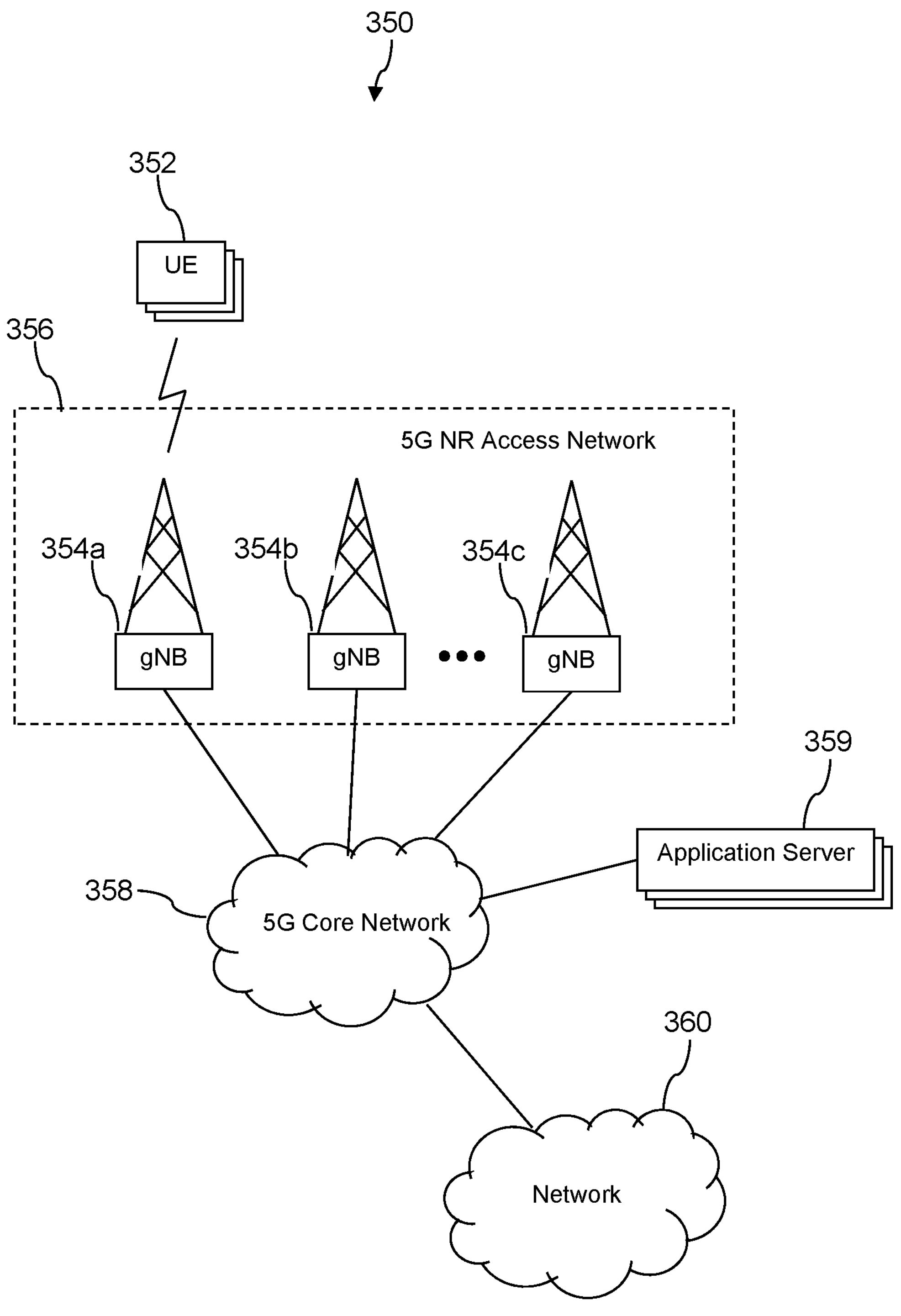
FIG. 9A is a block diagram of another communication system according to an embodiment of the disclosure.
Figure 9B:
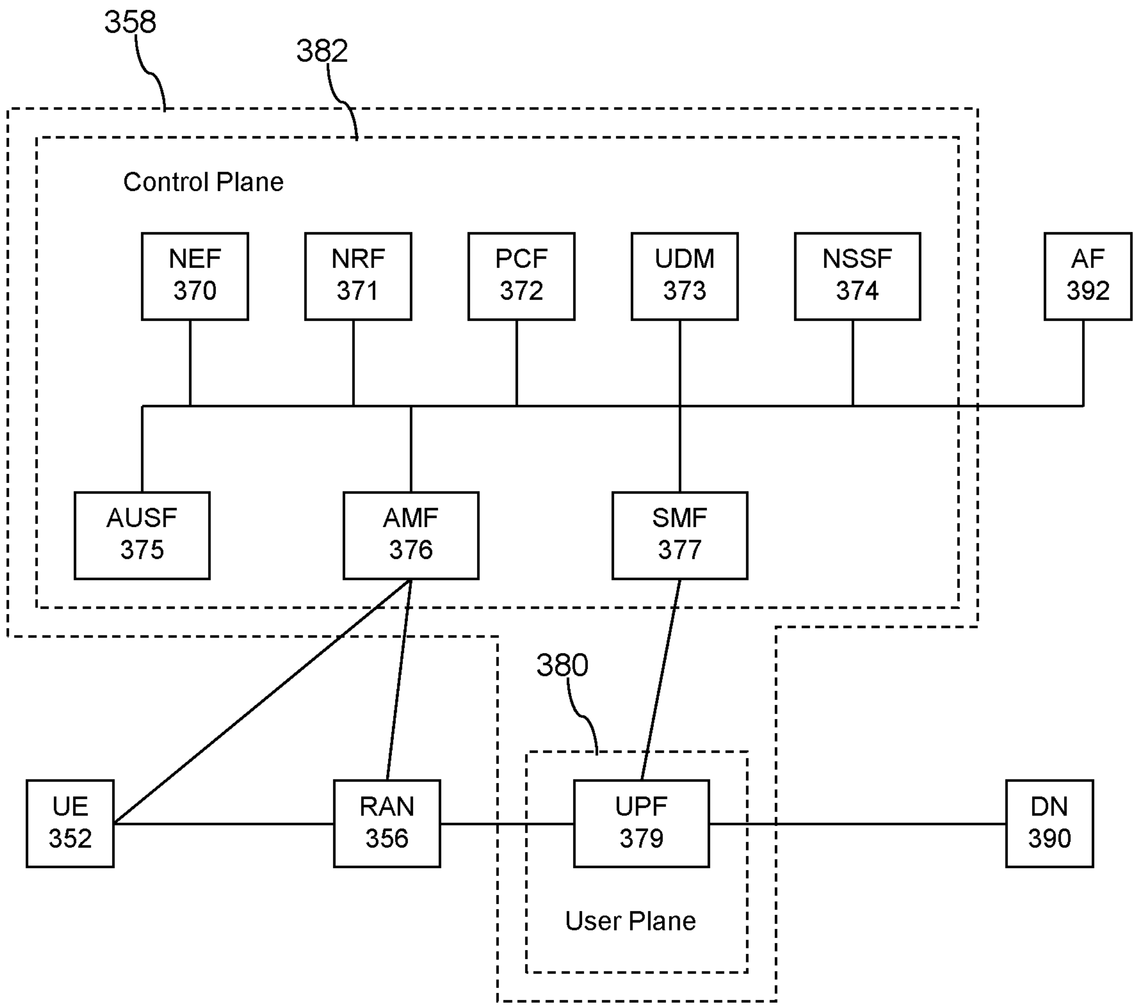
FIG. 9B is a block diagram of a core network of the communication system of FIG. 9A according to an embodiment of the disclosure.

Turning now to FIG. 9A, an exemplary communication system 350 is described. Typically, the communication system 350 includes a number of access nodes 354 that are configured to provide coverage in which UEs 352 such as cell phones, tablet computers, machine-type-communication devices, tracking devices, embedded wireless modules, and/or other wirelessly equipped communication devices (whether or not user operated), can operate. The access nodes 354 may be said to establish an access network 356. The access network 356 may be referred to as a radio access network (RAN) in some contexts.

In a 5G technology generation an access node 354 may be referred to as a next Generation Node B (gNB). In 4G technology (e.g., long term evolution (LTE) technology) an access node 354 may be referred to as an evolved Node B (eNB). In 3G technology (e.g., code division multiple access (CDMA) and global system for mobile communication (GSM)) an access node 354 may be referred to as a base transceiver station (BTS) combined with a base station controller (BSC). In some contexts, the access node 354 may be referred to as a cell site or a cell tower. In some implementations, a picocell may provide some of the functionality of an access node 354, albeit with a constrained coverage area. Each of these different embodiments of an access node 354 may be considered to provide roughly similar functions in the different technology generations.

In an embodiment, the access network 356 comprises a first access node 354*a*, a second access node 354*b*, and a third access node 354*c*. It is understood that the access network 356 may include any number of access nodes 354. Further, each access node 354 could be coupled with a core network 358 that provides connectivity with various application servers 359 and/or a network 360. In an embodiment, at least some of the application servers 359 may be located close to the network edge (e.g., geographically close to the UE 352 and the end user) to deliver so-called "edge computing." The network 360 may be one or more private networks, one or more public networks, or a combination thereof. The network 360 may comprise the public switched telephone network (PSTN). The network 360 may comprise the Internet. With this arrangement, a UE 352 within coverage of the access network 356 could engage in air-interface communication with an access node 354 and could thereby communicate via the access node 354 with various application servers and other entities.

The communication system 350 could operate in accordance with a particular radio access technology (RAT), with communications from an access node 354 to UEs 352 defining a downlink or forward link and communications from the UEs 352 to the access node 354 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 354 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 354 could define an air interface configured in a specific manner to define physical resources for carrying information wirelessly between the access node 354 and UEs 352.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 352.

In addition, certain resource elements on the example air interface could be reserved for special purposes. For instance, on the downlink, certain resource elements could be reserved to carry synchronization signals that UEs 352 could detect as an indication of the presence of coverage and to establish frame timing, other resource elements could be reserved to carry a reference signal that UEs 352 could measure in order to determine coverage strength, and still other resource elements could be reserved to carry other control signaling such as PRB-scheduling directives and acknowledgement messaging from the access node 354 to served UEs 352. And on the uplink, certain resource elements could be reserved to carry random access signaling from UEs 352 to the access node 354, and other resource elements could be reserved to carry other control signaling such as PRB-scheduling requests and acknowledgement signaling from UEs 352 to the access node 354

The access node 354, in some instances, may be split functionally into a radio unit (RU), a distributed unit (DU), and a central unit (CU) where each of the RU, DU, and CU have distinctive roles to play in the access network 356. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Turning now to FIG. 4B, further details of the core network 358 are described. In an embodiment, the core network 358 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 379, an authentication server function (AUSF) 375, an access and mobility management function (AMF) 376, a SMF 377, a network exposure function (NEF) 370, a network repository function (NRF) 371, a policy control function (PCF) 372, a UDM 373, a network slice selection function (NSSF) 374, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 358 may be segregated into a user plane 380 and a control plane 382, thereby promoting independent scalability, evolution, and flexible deployment.

The UPF 379 delivers packet processing and links the UE 352, via the access network 356, to a data network 390 (e.g., the network 360 illustrated in FIG. 9A). The AMF 376 handles registration and connection management of non-access stratum (NAS) signaling with the UE 352. Said in other words, the AMF 376 manages UE registration and mobility issues. The AMF 376 manages reachability of the UEs 352 as well as various security issues. The SMF 377 handles session management issues. Specifically, the SMF 377 creates, updates, and removes (destroys) PDU sessions and manages the session context within the UPF 379. The SMF 377 decouples other control plane functions from user plane functions by performing dynamic host configuration protocol (DHCP) functions and IP address management functions. The AUSF 375 facilitates security processes.

The NEF 370 securely exposes the services and capabilities provided by network functions. The NRF 371 supports service registration by network functions and discovery of network functions by other network functions. The PCF 372 supports policy control decisions and flow based charging control. The UDM 373 manages network user data and can be paired with a user data repository (UDR) that stores user data such as customer profile information, customer authentication number, and encryption keys for the information. An application function 392, which may be located outside of the core network 358, exposes the application layer for interacting with the core network 358. In an embodiment, the application function 392 may be execute on an application server 359 located geographically proximate to the UE 352 in an "edge computing" deployment mode. The core network 358 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 374 can help the AMF 376 to select the network slice instance (NSI) for use with the UE 352.

Figure 10A:
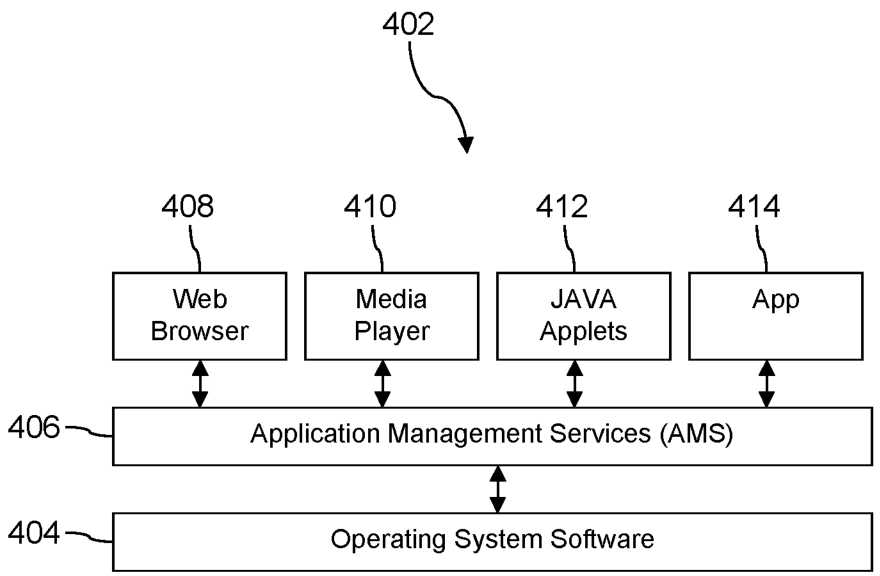
FIG. 10A is a block diagram of a software environment according to an embodiment of the disclosure.

FIG. 10A illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services (AMS) 406 that transfer control between applications running on the UE 400. Also shown in FIG. 10A are a web browser application 408, a media player application 410, and JAVA applets 412. The web browser application 408 may be executed by the UE 400 to browse content and/or the Internet, for example when the UE 400 is coupled to a network via a wireless link. The web browser application 408 may permit a user to enter information into forms and select links to retrieve and view web pages. The media player application 410 may be executed by the UE 400 to play audio or audiovisual media. The JAVA applets 412 may be executed by the UE 400 to provide a variety of functionality including games, utilities, and other functionality.

Figure 10B:
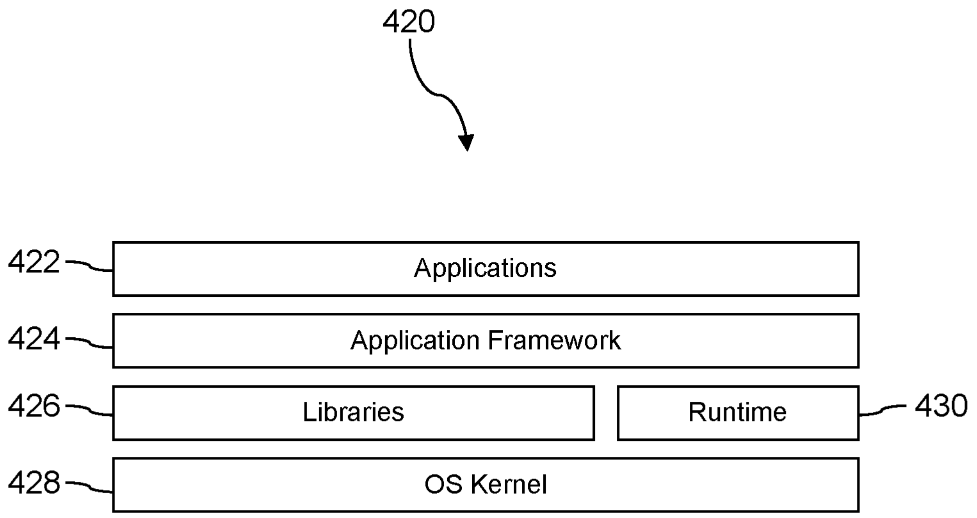
FIG. 10B is a block diagram of another software environment according to an embodiment of the disclosure.

FIG. 10B illustrates an alternative software environment 420 that may be implemented by the DSP 302. The DSP 302 executes operating system kernel (OS kernel) 428 and an execution runtime 430. The DSP 302 executes applications 422 that may execute in the execution runtime 430 and may rely upon services provided by the application framework 424. Applications 422 and the application framework 424 may rely upon functionality provided via the libraries 426.

Figure 11:
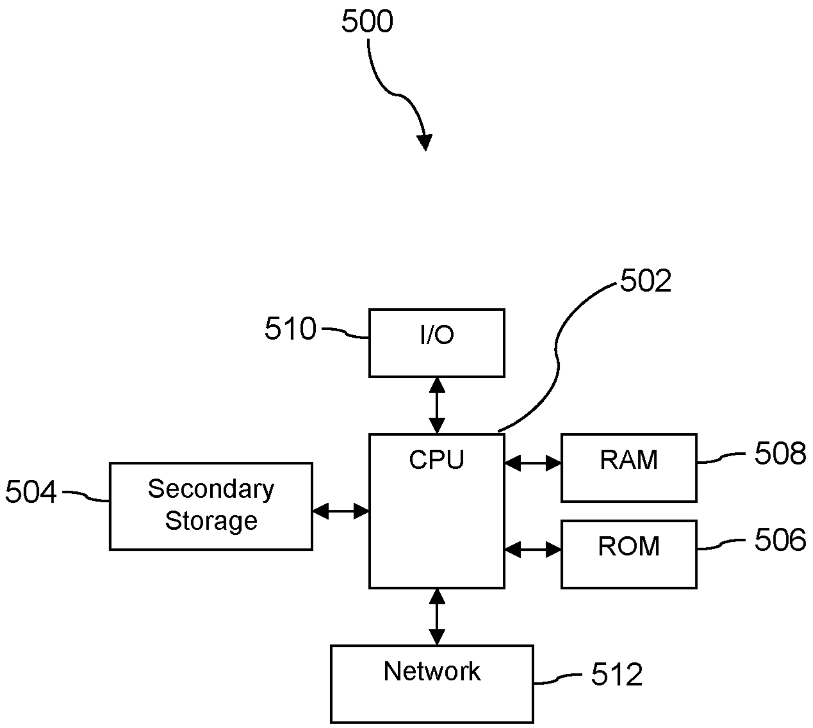
FIG. 11 is a block diagram of a computer system according to an embodiment of the disclosure.

FIG. 11 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for automatically managing user access to resources of a communication system, the method comprising:

receiving by a requester interface of an automated resource access manager a request by a user for access to a requested resource of the communication system, the access request communicated from a user equipment (UE) of the user to the requester interface;

providing automatically by an approver interface of the automated resource access manager the access request to a UE of an approver associated with the requested resource, the requested resource comprising a requested application of the communication system;

receiving by the approver interface a granting of access to the requested application, the granting of access communicated from the UE of the approver to the approver interface, wherein the granting of access is conditioned on the user meeting a predefined access criteria;

providing by the requester interface to the UE of the user a notification indicating the grant of access to the requested application;

responsive to receiving by the approver interface the granting of access to the requested application, providing automatically, by the requester interface, the user access to the requested application in response to receiving by the approver the granting of access to the requested application;

subsequent to providing the user access to the requested application, determining, by the automated resource access manager, that the user fails to satisfy the predefined access criteria;

responsive to the user failing to satisfy the predefined access criteria as determined by the automated resource access manager, revoking automatically by the requester interface and without input from the approver, access to the requested application from the user, wherein the revoking is performed without any human input; and providing by an access records manager of the automated resource access manager a machine-to-machine notification to the requested application of the revocation of the access of the user to the requested application.

2. The method of claim 1, wherein the machine-to-machine notification identifies a cause of the revocation of access from the user to the requested application.

3. The method of claim 1, further comprising:

providing by the requester interface to the UE of the user a notification of the revocation of the access of the user to the requested application; and providing by the approver interface to the UE of the approver a notification of the revocation of the access of the user to the requested application.

4. The method of claim 1, further comprising, based on the machine-to-machine notification, updating by the application a local user access record of the application to reflect the revocation of the access of the user to the requested application.

5. The method of claim 1, further comprising querying by the access records manager of the automated resource access manager a set of resource access records stored in a datastore of the communication system.

6. The method of claim 1, further comprising providing by the requester interface to the UE of the user a notification granting of access to the requested application.

7. The method of claim 1, further comprising:

querying by an access records manager of the automated resource access manager a set of resource access records stored in a datastore of the communication system;

periodically auditing automatically by the access records manager using the set of resource access records one or more users to determine which of the resources of the communication system the one or more users have previously been granted access and identities of approvers responsible for the granting of access to any of the resources of the communication system to which the one or more users have been previously granted access; and periodically updating by the access records manager the set of resource access records based on the auditing to indicate access granted and revoked from the one or more users to one or more of the resources of the communication system based on the periodic auditing by the access records manager.

8. The method of claim 7, further comprising determining by the access records manager, based on the auditing of the one or more users by the access records manager, that access of at least one of the one or more users had previously been incorrectly granted to at least one of the resources of the communication system.

9. The method of claim 8, further comprising revoking automatically, by the requester interface, access of the at least one of the one or more users to the at least one of the resources of the communication system to which the at least one of the one or more users had previously been incorrectly granted access.

10. The method of claim 7, wherein the set of resource access records applies one or more constraints to the access granted to the one or more users of one or more requested resources whereby the access granted to the one or more users of the one or more requested resources is subject to revocation in response to a violation by the one or more users of the one or more constraints.

11. The method of claim 1, further comprising receiving by the approver interface information pertaining to the user provided to the approver interface from the approver whereby the information is accessible through the approver interface to other approvers associated with the requested resource or other resources of the communication system.

12. The method of claim 1, wherein the approver is selected by the automated resource access manager based on an identity of the user and an identity of the requested resource.

13. The method of claim 1, wherein the requested resource comprises a security group of the communication system and the approver is selected by the automated resource access manager based on an identity of the security group.

14. The method of claim 13, wherein the security group has a plurality of access tiers and the approver is selected by the automated resource access manager based on an access tier of the plurality of access tiers identified as appropriate for the user by the automated resource access manager.

15. The method of claim 1, wherein the requester interface revokes access to the requested resource from the user in response to the user failing to access the requested resource after a predefined time period.

16. The method of claim 1, wherein the requester interface revokes access to the requested resource from the user in response to expiration of a maximum access time period associated with the requested resource.

17. The method of claim 1, wherein the requester interface revokes access to the requested resource from the user in response to a change in an employment status of the user.

18. The method of claim 16, wherein the predefined access criteria comprises a predefined access time period delimiting access of the user to the requested resource.

19. The method of claim 18, further comprising providing by the requester interface to the UE of the user a notification of an impending revocation of the granting of access to the requested resource in response to a difference between the predefined access time period and a current duration of access granted to the user of the requested resource equaling a predefined threshold.

20. The method of claim 5, further comprising providing information pertaining to at least one of the user or the requested resource from the set of resource access records to the approver via the approver interface, wherein the approver grants the user access or denies the user access to the requested resource based on the information.

* * * * *